UNITED STATES PATENT OFFICE.

ARTHUR L. KENNEDY, OF BURLINGTON, VERMONT, ASSIGNOR, BY MESNE ASSIGNMENTS, TO THE MARSDEN COMPANY, OF CAMDEN, NEW JERSEY, AND PHILADELPHIA, PENNSYLVANIA.

COMPOSITION OF MATTER AND ARTICLE TREATED THEREWITH.

SPECIFICATION forming part of Letters Patent No. 587,097, dated July 27, 1897.

Application filed January 19, 1897. Serial No. 619,791. (No specimens.)

*To all whom it may concern:*

Be it known that I, ARTHUR L. KENNEDY, a citizen of the United States, residing at Burlington, in the county of Chittenden and State of Vermont, have invented certain new and useful Improvements in Compositions of Matter and Articles Treated Therewith, of which the following is a specification.

This invention has reference to a composition of matter for the treatment of leather and similar materials and the article so treated; and it consists, substantially, in such features of improvement as will hereinafter be more particularly described.

While specially adapted for the production of a polished or enameled surface on leather, my invention is equally adapted for the production of a similar surface on artificial materials resembling leather; and the object of the invention is to provide a composition of matter to be used as a coating or enamel that is easily and quickly prepared, comparatively quick to dry, and one also that renders the leather or other suitable material both water and damp proof, as well as of a highly-finished character, and also to produce an article coated with the composition of matter.

In carrying my invention into effect the leather to be treated is suitably dressed to give it the required texture and surface-finish—say, for instance, by subjecting the same to the usual pumicing process—and then my improved enamel or solution is applied. I first prepare a solution comprising nitrate of cellulose, or, more properly speaking, nitrocellulose, combined with lanolin and corn-oil, and in order to give proper shade or color to the solution anilin-black is added in proper quantity or proportions. The proportions of these several ingredients may be varied to a considerable degree in some instances, and I may employ any suitable solvent for the cellulose. I have found, however, amylactate or acetate of amyl to be the best or most advantageous solvent, and I therefore employ this substance in the practice of my invention. I have found the following proportions to furnish the best advantages, although, as I have before stated, these may be varied under certain conditions, and I therefore do not wish to be understood as limiting myself strictly thereto. For instance, I employ as the solvent one gallon of amylactate or acetate of amyl, to which are added twelve ounces of nitrocellulose, ten ounces of lanolin, and three ounces of corn-oil. The percentage or proportion of anilin-black added to the mixture will of course vary in proportion to the depth or lightness of shade or color, and therefore no strict proportions thereof need be furnished herein. After the leather has been rendered of the proper texture on its surface I coat the same with the solution described, and I then allow it to thoroughly dry, which requires usually from ten to twelve hours, more or less. The application of this solution or coating to the leather renders the leather practically waterproof or impervious to moisture, and it also furnishes a sort of body for the reception of the finish-coating, which is applied as soon as the first coating has become sufficiently dry. This finishing coat or solution comprises amylactate or acetate of amyl, combined with nitrocellulose, in the proportion of about one gallon of the first ingredient to ten ounces of the latter. This second coat is simply applied over the first coating, and after it has become dry the leather or other material will be found to possess a very highly polished or finished surface, and one that is practically permanent and not easily destroyed either by atmospheric effects or by contact with other bodies. It will not crack or break, as ordinary patent leather, and can be produced in any desired color. The coating of the leather or other similar material may be effected in any way known in the arts, and as there are many different ways for so doing I have not considered it necessary to illustrate herein any particular form of machine or apparatus for the purpose.

In some instances it might be expedient or advantageous to employ a finishing-coating of some other composition than that herein mentioned, but for all practical purposes I prefer the use of the finishing-coating described, since it gives good results, and I have found that the body-coating first applied seems to have a special affinity or receptive quality therefor.

Without limiting myself to the precise proportions or materials specified, I claim—

1. A composition of matter comprising nitrocellulose, lanolin and corn-oil, substantially as described.

2. As a new article of manufacture a leather or similar material having a body-coating of nitrocellulose, lanolin and corn-oil, and an outer finishing-coating of a solution of nitrocellulose, substantially as described.

3. A composition of matter to be applied as a coating solution to the surface of leather and other similar materials, the same being comprised of the following-named ingredients in about the proportions specified as follows, to wit: one gallon of amylactate, twelve ounces of nitrocellulose, ten ounces of lanolin, and three ounces of corn-oil, the whole being mixed and combined with anilin or other coloring-matter, substantially as and for the purpose set forth.

In testimony whereof I have signed my name to this specification in the presence of two subscribing witnesses.

ARTHUR L. KENNEDY.

Witnesses:
FRANCIS S. LAWS,
HENRY C. WATTS.